(12) United States Patent
Itakura

(10) Patent No.: US 6,615,421 B2
(45) Date of Patent: Sep. 9, 2003

(54) EXPANDABLE LAVATORY UNIT FOR AIRCRAFT

(75) Inventor: Ushio Itakura, Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 09/988,734

(22) Filed: Nov. 20, 2001

(65) Prior Publication Data
US 2002/0062521 A1 May 30, 2002

(30) Foreign Application Priority Data
Nov. 22, 2000 (JP) ........................................ 2000-355310

(51) Int. Cl.⁷ ................................................. A47K 4/00
(52) U.S. Cl. ........................................ 4/664; 244/118.5
(58) Field of Search .................. 4/663, 664; 244/118.5; 52/34, 67

(56) References Cited

U.S. PATENT DOCUMENTS

| | | | | |
|---|---|---|---|---|
| 882,760 A | * | 3/1908 | Hubert | ................... 52/34 X |
| 2,650,368 A | * | 9/1953 | Evans | ......................... 52/34 |
| 4,396,240 A | * | 8/1983 | Henson | ...................... 4/664 X |
| 4,589,463 A | | 5/1986 | Ryan | ........................... 160/88 |
| 6,007,025 A | | 12/1999 | Coughren et al. | ........ 244/118.6 |
| 6,079,669 A | | 6/2000 | Hanay et al. | ............ 244/118.5 |

* cited by examiner

Primary Examiner—Robert M. Fetsuga
(74) Attorney, Agent, or Firm—Armstrong, Westerman & Hattori, LLP.

(57) ABSTRACT

The lavatory unit shown as a whole by reference number 1 comprises a box-shaped lavatory body 10 formed of panel material, which is positioned to an appropriate position on a floor panel 70 of an aircraft. A toilet unit 20 is fixed on a floor panel 110 inside the lavatory body 10, and a wash basin unit 30 is equipped to one side of said toilet unit 20. The lavatory body 10 stows a storage module 50 capable of being pulled out of and stowed again to the body 10. Said storage module 50 includes for example a closet for storing the coats and jackets of passengers etc. A state is shown where the closet 50 is pulled out of the lavatory body 10, expanding the lavatory unit. The space inside the lavatory is expanded, allowing the use of a bench 150 etc., thus improving the service provided to passengers. A part of the closet 50 being pulled out protrudes to the space in front of the aircraft door 80, but since this space is not used during flight, the space inside the aircraft is utilized efficiently.

3 Claims, 7 Drawing Sheets

EXPANDABLE LAVATORY UNIT FOR AIRCRAFT

FIELD OF THE INVENTION

The present invention relates to a lavatory unit on board an aircraft (hereinafter called lavatory).

In a passenger aircraft where there is substantially no isolated space providing privacy to the passengers, the lavatory is utilized not only as a toilet or a powder room, but also as a space to change his/her clothes. The passenger wishes to change his/her clothes in order to relax during the long hours on board the aircraft or to correspond to the climate of the destination.

However, the size of a conventional lavatory is generally not sufficient for getting changed. On the other hand, there are desires among the passengers on board the upper classes where the seats are also used as beds to change into clothes that allow them to lie down and relax. Therefore, some airlines have equipped larger lavatories on board the aircraft, but since large sized lavatories take up the limited cabin space of the aircraft and reduce the revenue, such lavatories are not popular. Moreover, the lavatories are mainly positioned near the exit (door) of the aircraft together with facilities other than the passenger cabin, such as coat closets and other various storage units, but since the airlines do not wish to reduce the number of passenger seats on board so as to maintain profit, such facilities had to be diminished when mounting the large sized lavatory.

On the other hand, the area near the exit where the lavatories are often placed is of great importance when the plane is on the ground as the entrance and exit of the aircraft and when during departure and arrival as the emergency escape hatch or emergency passage, but the area is often not used during flight.

U.S. Pat. No. 4,589,463 (May 20, 1986,) and U.S. Pat. No. 6,079,669 (Sep. 30, 1998) disclose patents related to expandable (stowable) lavatory, but both patents lack to disclose the art of expanding the interior space of a general-sized lavatory and adding further value to the lavatory space.

SUMMARY OF THE INVENTION

The present invention relates to storing a closet or other storage facility inside a lavatory as a module, and when there is need for a larger lavatory space, moving/deploying such module to the exit space that is normally not used during flight so as to expand the interior space of the lavatory, providing sufficiently wide space for example to passengers wanting to get changed or for passengers on a wheelchair.

The present lavatory is mounted in front of the exit of an aircraft, the lavatory comprising a body and a pullout storage module being stowed within the body and positioned at one side of the body close to the exit of the aircraft.

The lavatory body has sufficient size for stowing the storage module, comprising a normal door and an opening portion formed to the exit side of the aircraft allowing the pullout storage module to be pulled out of and returned back to the lavatory body.

When there is need to provide a large interior space allowing the passenger to get changed etc., the storage module is fixed to the storage position and the lock is released, and then the module is pulled out using a pullout handle mounted to the front panel of the module. After pulling out the module completely, a fixing latch is operated to fix the storage module at the deployed position. The whole operation explained above can be performed from outside the lavatory.

When the storage module is pulled out, the interior space of the lavatory is expanded corresponding to where the storage module was stowed, thus enabling to provide a wide and pleasant private space for the passenger.

The storage module is pulled out to the exit space near the door of the aircraft that is not used during flight, so there is no wasted space, and the pulled out storage module will not block the necessary space on board such as the aisle of the passenger cabin.

Since the door of the pullout storage module is designed to match the opening portion of the lavatory, the storage module can be used anytime without having to move the module. Accordingly, even when there is a need to store coats and bags of the passengers in the storage module while on ground, the storage module can be used without blocking the entrance of the aircraft.

Moreover, the lavatory secures a normal-sized interior space even when the pullout storage module is stowed, and the door of the lavatory is formed to face the aisle of the cabin separately from the opening for storing the storage module, so the lavatory can always be used as ordinary lavatory.

DETAILED DESCRIPTION OF PREFERRED EMBODIMENTS

Figure 1:
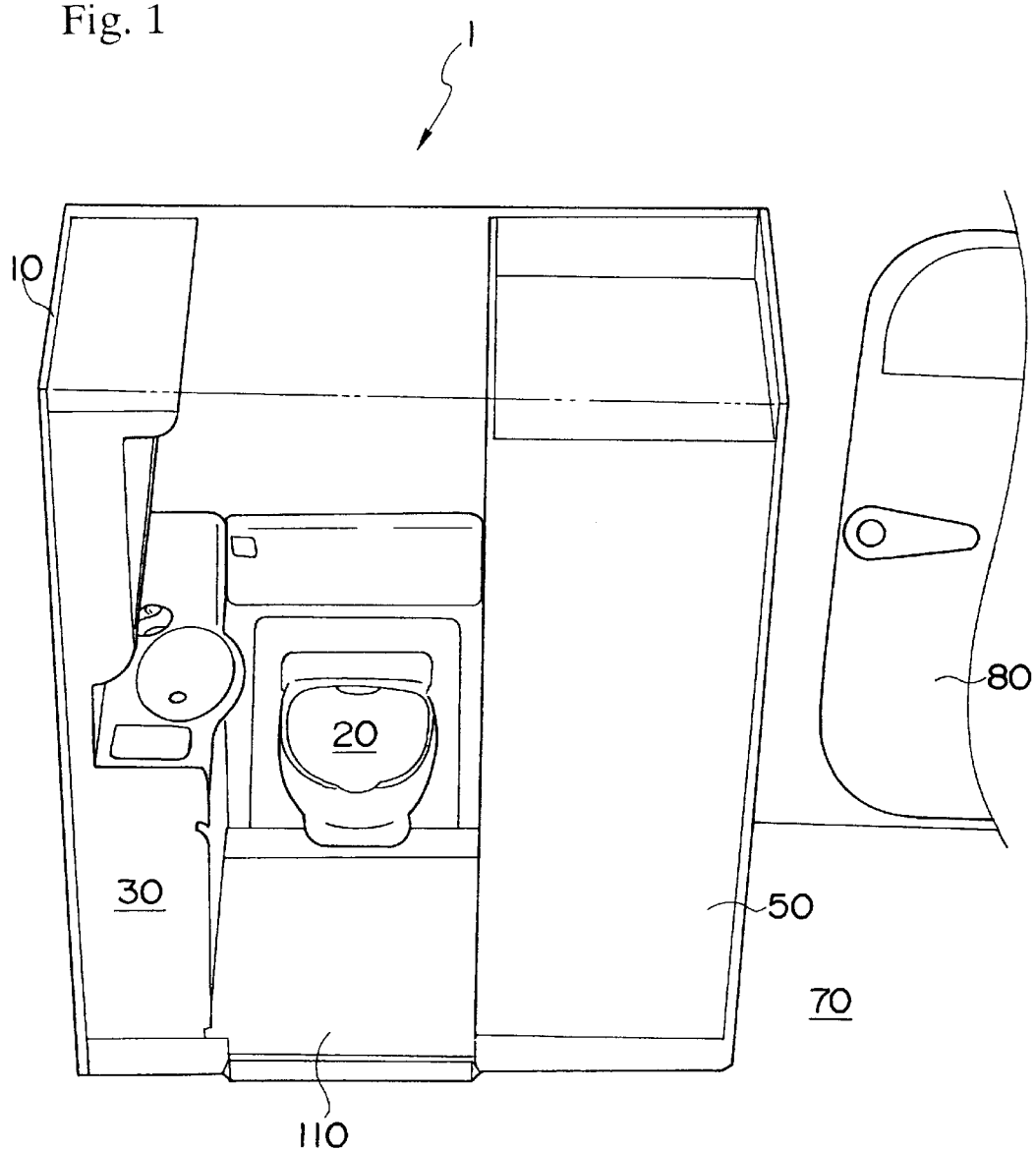
FIG. 1 is a perspective view of the lavatory unit according to the present invention.
Figure 2:
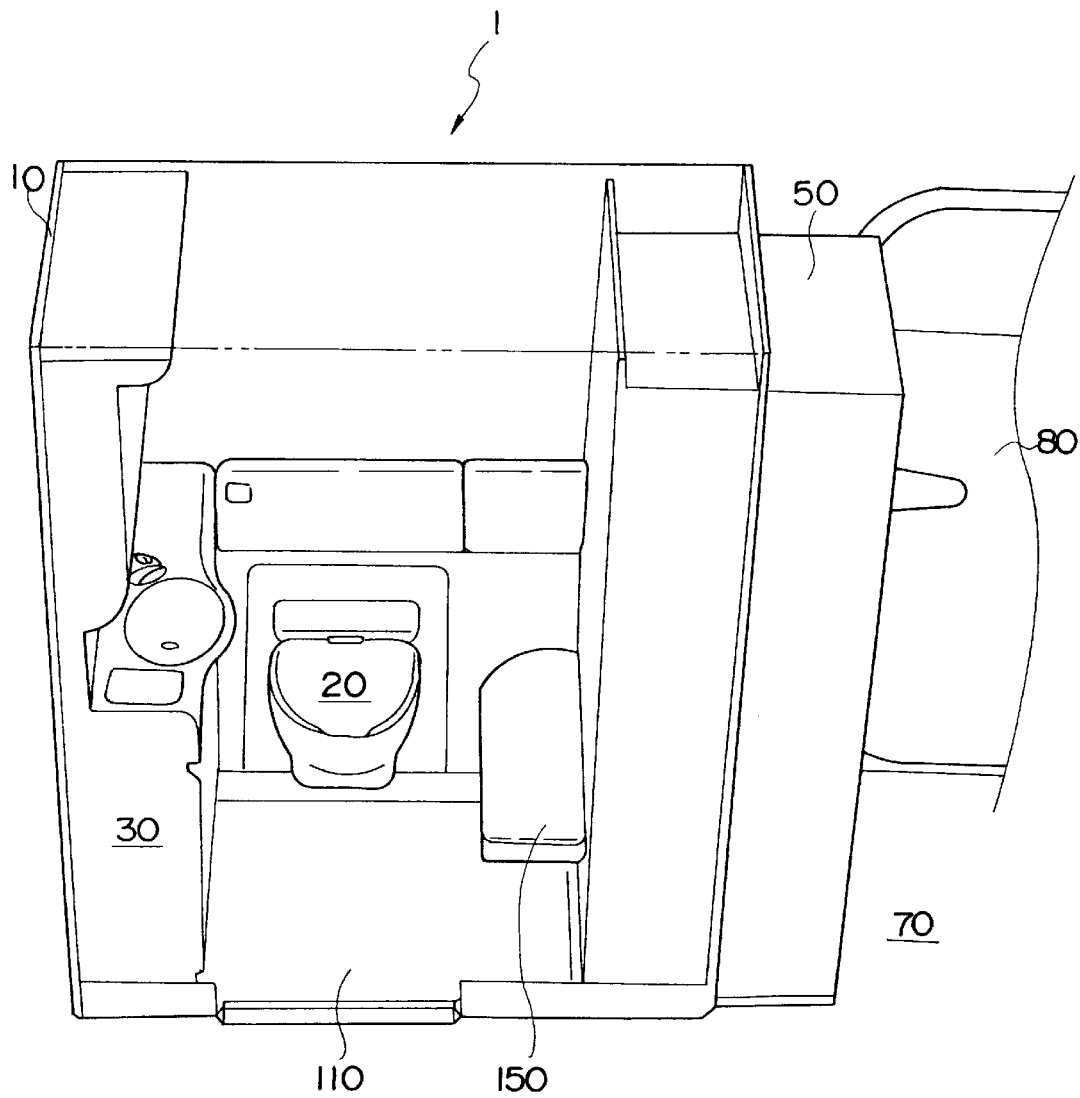
FIG. 2 is a perspective view of the lavatory unit according to the present invention.

FIG. 1 and FIG. 2 are perspective views of a lavatory unit equipped to an aircraft according to the present invention.

The lavatory unit shown as a whole by reference number 1 comprises a box-shaped lavatory body 10 formed of a panel material, which is placed at an appropriate position on a floor panel 70 of an aircraft.

A toilet unit 20 is fixed on the floor 110 inside the lavatory body 10, and a wash basin unit 30 is equipped to one side of the toilet unit 20.

A storage module 50 is mounted to the lavatory body 10, the module 50 being able to be pulled out of and stowed again to the lavatory body. The storage module 50 is equipped for example with a closet for storing the coats and jackets of the passengers.

Seats for the upper class passengers are positioned toward the bow of the aircraft beyond the front door 80, and the coats and jackets of the passengers aboard these classes are stored in the closet during flight.

The lavatory unit 10 for the upper classes are positioned in the space in front of the front door 80 toward the bow of the aircraft.

FIG. 1 shows the state where the closet 50 is stowed in the lavatory body 10. Even during such state the panel of the storage module 50 facing the interior side of the lavatory is locked to a position so as not to interfere with the opening portion of the entrance door for the lavatory, enabling the passenger to use the toilet 20 and the wash basin 30 comfortably.

Further, the floor space 70 leading to the door 80 is reserved sufficiently, enabling the passengers etc. to enter or exit through the door 80.

FIG. 2 shows the state where the closet 50 is pulled out of the lavatory body 10 expanding the lavatory unit volume.

The space inside the lavatory is expanded, even allowing use of a bench 150 and the like. Therefore, the service provided to the passengers is improved.

A portion of the closet 50 being pulled out protrudes to the space in front of the door 80, but since this space is not used during flight, it realizes a sufficient use of space.

Figure 3:
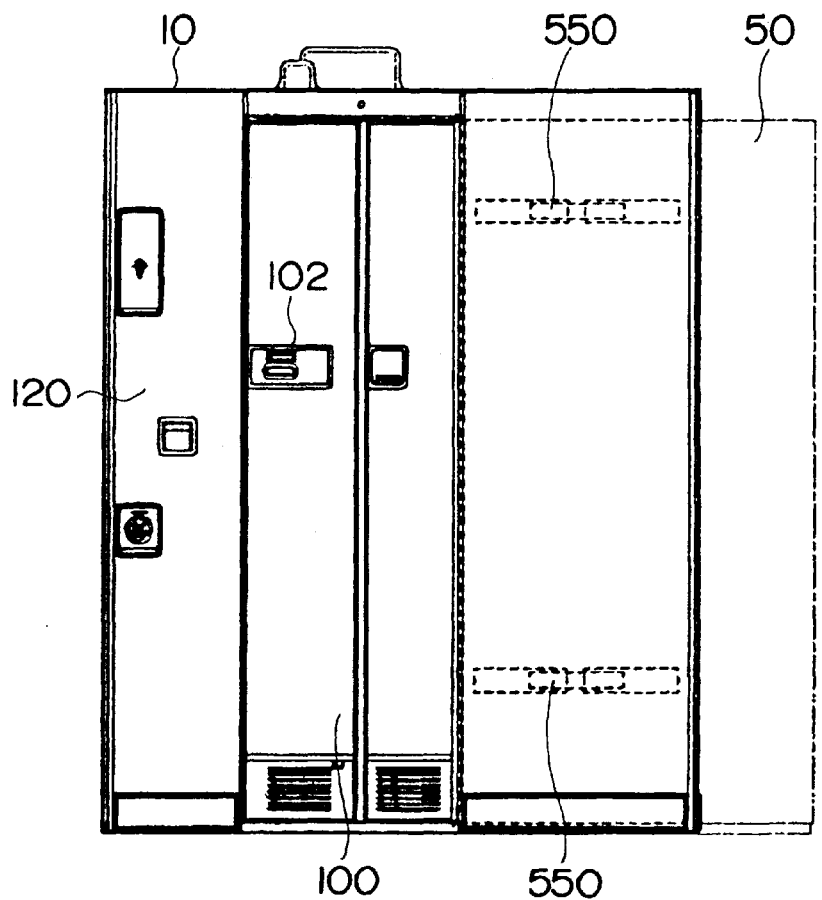
FIG. 3 is a front view of the lavatory unit according to the present invention.
Figure 4:
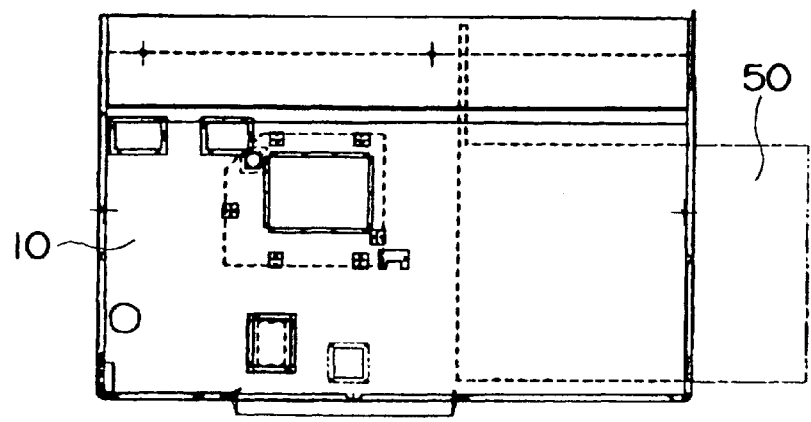
FIG. 4 is an upper view of the lavatory unit according to the present invention.
Figure 5:
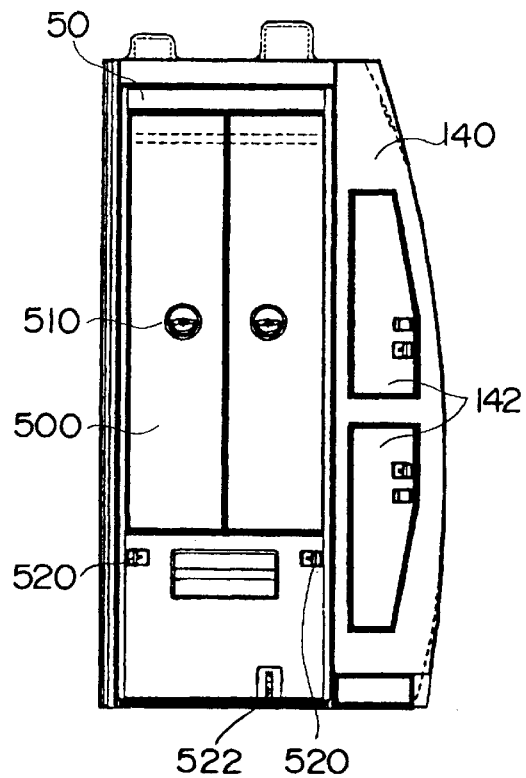
FIG. 5 is a right side view of the lavatory unit according to the present invention.
Figure 6:
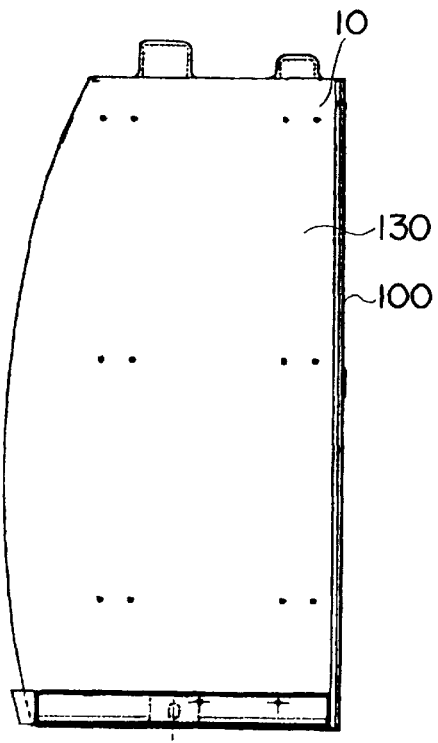
FIG. 6 is a left side view of the lavatory unit according to the present invention.

FIG. 3 is a front view showing the exterior of the lavatory unit according to the present invention, FIG. 4 is an upper view thereof, FIG. 5 is a right side view thereof, and FIG. 6 is a left side view thereof.

A center folding door 100 is mounted to the front side of the lavatory body 10, which can be opened and closed by a doorknob 102. An appropriate member is equipped to a front panel 120 adjacent to the door 100.

The opening of the lavatory body 10 facing the door of the aircraft incorporates a closet 50. The closet 50 is a rectangular box-shaped body, having a door 500 equipped to the front side thereof that can be opened and closed by a knob 510. The closet 50 is supported to the front panel 120 by a slide rail 550 with a ball bearing, enabling the closet to be guided smoothly when being pulled out of or stowed back to the body 10.

Plural lock devices 520, 522 are mounted to the front surface of the closet 50. The lock device 520 is for fixing the closet 50 to the lavatory body 10 when the closet 50 is at a stowed state, and the lock device 522 is used for fixing the closet 50 to the floor of the aircraft when the closet is pulled out.

A door 142 for an appropriate storage unit is formed to the side panel 140 of the closet 50.

The outer surface of a panel 130 of the lavatory body 10 opposing to the closet 50 is positioned at the back of the cabin for the upper classes, and is covered by a decorative cloth and the like.

Figure 7:
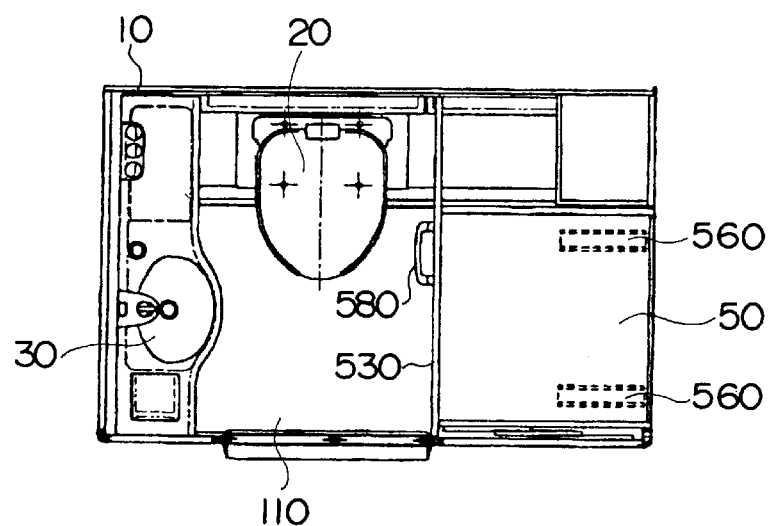
FIG. 7 is a cross-sectional plan view of the lavatory unit according to the present invention.

FIG. 7 is a cross-sectional plan view showing the state where the closet 50 is stowed in the lavatory body 10. The closet 50 is guided by a slide rail 560, and even when the expandable closet 50 is at a stowed position, the back panel 530 of the closet 50 is positioned so as not to interfere with the opening portion of the center folding door 100 of the lavatory body. Therefore, the toilet unit 20 and the wash basin 30 can be used freely even when the closet is stowed. A handle 580 can be equipped to the back panel 530 of the closet 50.

Figure 8:
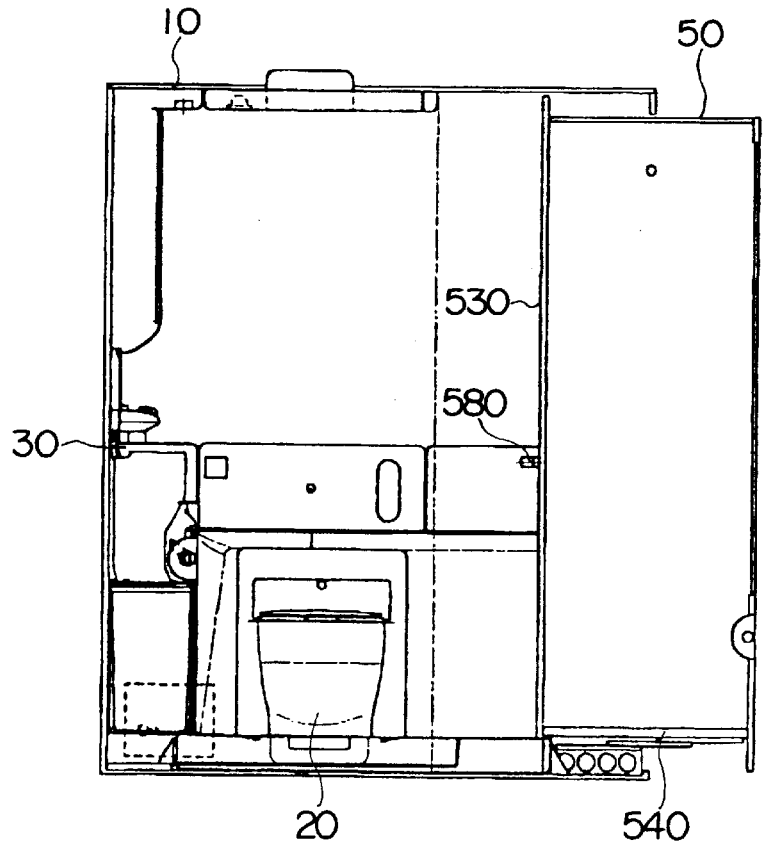
FIG. 8 is a vertical cross-sectional view of the lavatory unit according to the present invention.
Figure 9:
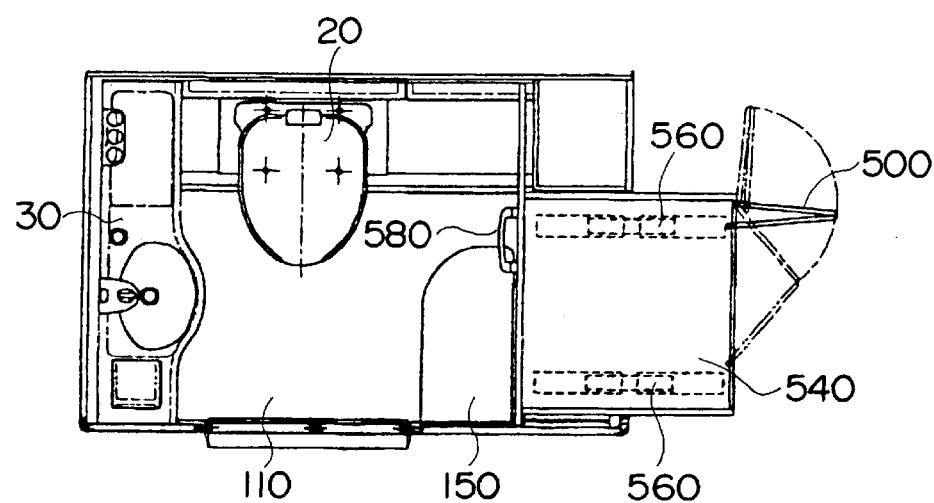
FIG. 9 is a cross-sectional plan view of the lavatory unit according to the present invention.
Figure 10:
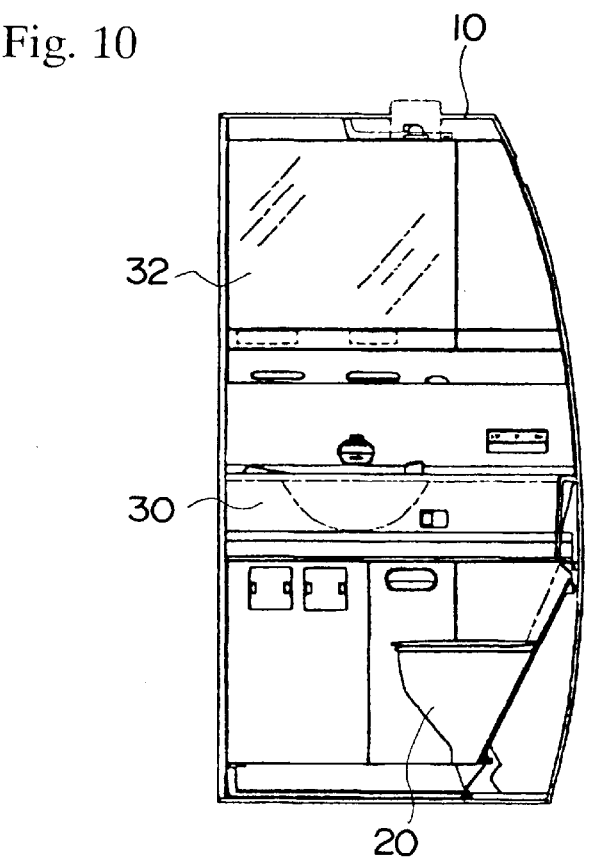
FIG. 10 is a cross-sectional right side view of the lavatory unit according to the present invention.
Figure 11:
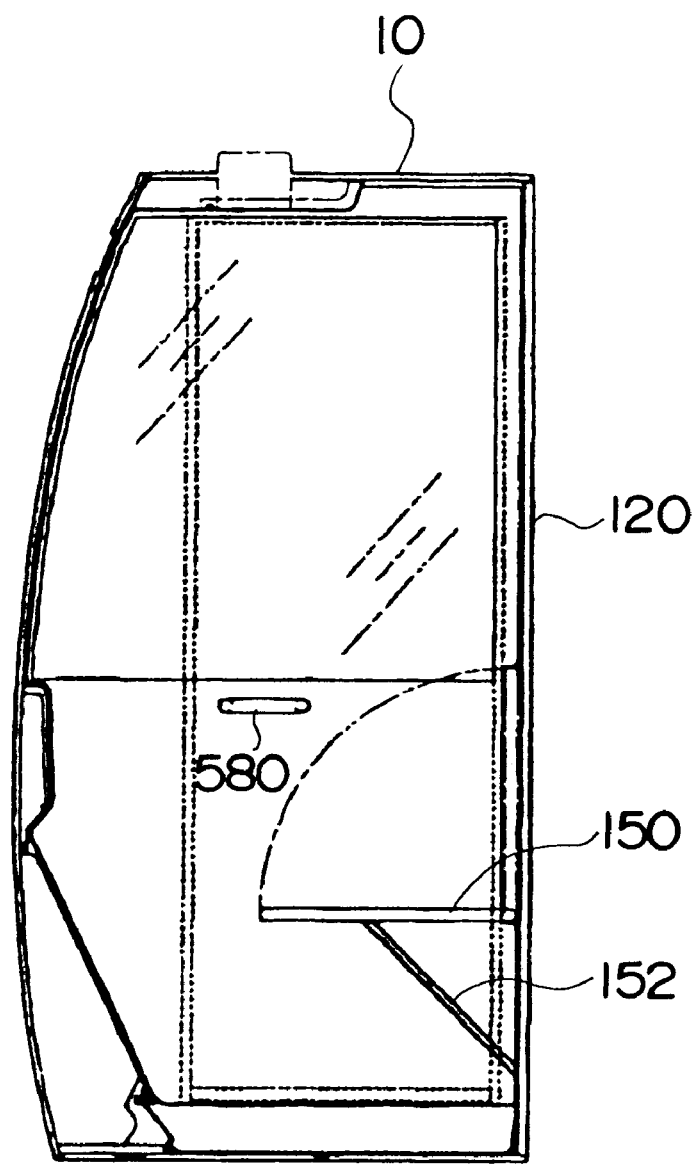
FIG. 11 is a cross-sectional left side view of the lavatory unit according to the present invention.

FIG. 8 is a front view showing the state where the closet 50 is pulled out and the space inside the lavatory body 10 is expanded, FIG. 9 is a plan view thereof, FIG. 10 is a right side view thereof, and FIG. 11 is a left side view thereof.

The floor space 110 of the lavatory is expanded, and the bench sheet 150 mounted between the closet 50 and the front plate 120 of the lavatory body is opened to the horizontal position, where it is fixed by a stem 152.

The user of the lavatory can use the bench sheet 150, providing further convenience.

A mirror 32 or the like is positioned above the wash basin 20.

The closet 50 is guided by a slide rail 560 positioned below the floor panel 540 when being pulled out. A center folding door 500 is mounted to the front side of the closet 50.

The lavatory unit according to the present invention maintains the function of a lavatory and a closet, while providing effective use of the limited space in the aircraft.

We claim:

1. An expandable lavatory unit for an aircraft, comprising:

a lavatory body formed of a panel material, said lavatory including a front wall and side walls;

an entrance door opening in said front wall panel of said lavatory body;

a door fitted in said entrance door opening to open and close said entrance door opening;

a toilet unit equipped inside said lavatory body against said rear wall;

a wash basin positioned at one side of said toilet unit in a basin-containing wall; and a storage module including side walls, a front wall, and a rear wall, wherein at least one of said walls of said storage module constitutes a wall of said lavatory body opposite said basin-containing wall;

wherein said storage module is slidably translatable from a maximally stowed position at least partially inside said lavatory body to an expanded position less inside said lavatory body;

wherein both said maximally stowed position and said expanded position are characterized by a smallest distance from said basin-containing wall to said storage module being greater than a distance from said basin-containing wall to a point of said toilet that is farthest from said basin-containing wall, wherein both said maximally stowed position and said expanded position are further characterized by said storage module not blocking said entrance door opening, and wherein both the storage area and the toilet are usable when said storage module is in either of said expanded position or said maximally stowed position.

2. An expandable lavatory unit for an aircraft according to claim 1, wherein the space in which said storage module is pulled out is the space in front of a door of said aircraft.

3. An expandable lavatory unit for an aircraft comprising a lavatory body formed of a panel material, an entrance door opening formed to the front wall panel of said lavatory body, a toilet unit equipped to said body opposing to said door, a wash basin positioned at one side of said toilet unit, and a storage module equipped to said body opposing to said wash basin and capable of being pulled out of said lavatory body, wherein when said storage module is stowed in said lavatory body, said storage module is locked to a position where the panel of said storage module facing the interior of said lavatory does not interfere with the opening portion of said entrance door of said lavatory body; and further comprising a bench sheet that deploys to a horizontal position inside said lavatory when said storage module is pulled out.

* * * * *